(12) United States Patent
Kato

(10) Patent No.: US 6,456,574 B1
(45) Date of Patent: Sep. 24, 2002

(54) DISK PLAYER

(75) Inventor: Masahiro Kato, Tokorozawa (JP)

(73) Assignee: Pioneer Corporation, Tokyo-to (JP)

(*) Notice: Subject to any disclaimer, the term of this patent is extended or adjusted under 35 U.S.C. 154(b) by 0 days.

(21) Appl. No.: 09/489,549

(22) Filed: Jan. 21, 2000

(30) Foreign Application Priority Data

Jan. 21, 1999 (JP) .......................................... 11-013127

(51) Int. Cl.$^7$ ............................................. G11B 7/005
(52) U.S. Cl. ................................ 369/47.21; 369/47.22; 369/47.28; 369/47.35
(58) Field of Search ......................... 369/124.14, 47.26, 369/107, 44.25, 275.3, 275.4, 124.1, 124.11, 124.12, 59.17, 59.2, 59.21, 47.21, 47.22, 47.28, 47.35

(56) References Cited

U.S. PATENT DOCUMENTS

| | | | |
|---|---|---|---|
| 5,073,886 A | * 12/1991 | Sasaki et al. | 369/107 |
| 5,732,051 A | * 3/1998 | Yamaguchi et al. | 369/44.25 |
| 6,058,093 A | * 5/2000 | Kato et al. | 369/124.14 |
| 6,330,213 B1 | * 12/2001 | Ishibashi et al. | 369/47.26 |

* cited by examiner

*Primary Examiner*—W. R. Young
*Assistant Examiner*—Kimlien T. Le
(74) *Attorney, Agent, or Firm*—Pitney, Hardin, Kipp & Szuch LLP

(57) ABSTRACT

A disk player for recording or reproducing recording information to a recording disk by emitting a light beam onto the recording disk. The recording disk has a recording track for recording the recording information, a guide track for guiding the light beam to the recording track, and a prepit which is pre-formed on the guiding track and which serves as control information for controlling a recording operation or a reproduction operation of the disk player. The disk player includes: a light receiving device that receives the light beam reflected by the recording disk and that has a light receiving surface in which a first receiving area, a second receiving area, a third receiving area and a forth receiving area are formed; a first generating device that generates a first difference signal indicating a difference between a first detection signal generated by the light beam that is received in the first receiving area and a third detection signal generated by the light beam that is received in the third receiving area; a second generating device that generates a second difference signal indicating a difference between a second detection signal generated by the light beam that is received in the second receiving area and a fourth detection signal generated by the light beam that is received in the fourth receiving area; and a phase difference detection device that detects a phase difference between the first difference signal and the second difference signal.

16 Claims, 10 Drawing Sheets

DISK PLAYER

BACKGROUND OF THE INVENTION

1. Field of the Invention

The present invention relates to a disk player for reproducing or recording recording information from or onto a disk type information recording medium with high recording density which is represented by DVD. Such a disk type information recording medium is DVD-Rewritable (hereinafter, referred to as DVD-RW) onto which the recording information can be written and where prepits are previously formed as various control information such as address information.

2. Description of the Related Art

As mentioned above, in a disk type information recording medium such as DVD-RW, prepits are formed in advance on the disk as preformed information which indicates various control information such as address information When the recording information is recorded or reproduced, the prepits are detected so that necessary control information can be obtained.

In the DVD-RW, for example, an information pit is formed on a groove track by changing reflectance in accordance with a crystal state or non-crystal state, and a prepit is previously formed on a land track as an uneven phase pit.

In an optical pick-up which is generally used for reproducing/recording information from/onto the disk type information recording medium, 4-divided light receiving elements are frequently used in order to realize focusing servo by means of astigmatism and tracking servo by means of push-pull. The 4-divided light receiving elements are also used for the detection of the prepits.

For example as shown in FIG. 7, a reflected light of a beam spot emitted onto the groove track 1 is divided into four areas A through D by the light receiving elements so that respective detection signals are obtained, and a prepit 3 formed on the land track 2 is detected by obtaining (A−B)+(D−C). The arrow in FIG. 7 shows the advance direction of the groove track 1. The advance direction of a light beam is opposite to the direction shown by the arrow in FIG. 7.

However, in the above-mentioned conventional prepit detection, a delay of the detection signals due to a property of the phase pit should be taken into consideration. Namely, in a disk type information recording medium such as DVD-R (DVD-Recordable), an information pit and a prepit are formed by making a substrate uneven so that a phase difference is given to the light beam, and the intensity of the light modulated by diffraction on the pit is detected. Therefore, because of a difference in properties such as diffraction efficiency and diffraction angle at the phase pits, detection timing varies in the respective areas of the light receiving elements.

FIG. 8 shows a conventional method of detecting the prepits using the conventional 4-divided light receiving elements. As is clear from FIG. 7, since the areas C and D of the four areas are in a forward position of a relatively forward direction of the light beam on the optical disk and the areas A and B are in a backward position, the detection timing of the information pit in the areas A and B is delayed from the detection timing in the areas C and D by $\Delta t1$. Meanwhile, as for the detection timing of the prepit, since a beam spot is on the groove track and the prepit is on the land track, diffraction property becomes complicated, and thus changes are made in the areas B and D earlier and changes in the areas A and C are delayed by $\Delta t2$. In addition, the changes in the areas A and D are made in a direction where the light intensity is weakened, and the changes in the areas B and C are made in a direction where the light intensity is strengthen.

When calculation is made according to A−B and D−C, changed portions of the signals due to the information pit are canceled, and only changed portions due to the prepit remain. Finally, the prepit is detected by a signal calculated according to (A−B)+(D−C). At this time, ml in the drawing is a prepit detecting range and is to be a detection margin. A threshold is set suitably within the range of ml so that the prepit is read.

At this time, in the case where the delay time $\Delta t2$ is zero, the prepit detecting range ml to be obtained must be larger. However, actually peaks of the changed portions due to the prepit do not coincide with each other because of the delay time $\Delta t2$, and thus ml becomes smaller. As a result, prepit detecting accuracy is restricted and an influence of malfunction due to a noise becomes great accordingly.

In addition, since the delay time $\Delta t2$ fluctuates depending on a cutting condition or the like of the prepit on the optical disk, it is not easy to predict an amount of the delay $\Delta t2$.

SUMMARY OF THE INVENTION

It is an object of the present invention to provide a disk player which is capable of obtaining prepit detection delay with high accuracy due to different areas of light receiving elements and to provide a disk player which is capable of preventing lowering of a detection margin of a prepit due to the detection delay and of detecting the prepit accurately without being influenced by a noise.

A disk player in accordance with the present invention is an apparatus for recording or reproducing recording information to a recording disk by emitting a light beam onto the recording disk. The recording disk has a recording track for recording the recording information, a guide track for guiding the light beam to the. recording track, and a prepit which is pre-formed on the guiding track and which serves as control information for controlling a recording operation or a reproduction operation of the disk player. The disk player includes a light receiving device that receives the light beam reflected by the recording disk and that has a light receiving surface in which a first receiving area, a second receiving area, a third receiving area and a forth receiving area are formed. The first receiving area and the second receiving area are located in a back area of the light receiving surface with respect to an advance direction of a relative movement of the light beam with respect to the recording track. The third receiving area and the fourth receiving area are located in a front area of the light receiving surface with respect to the advance direction of the movement of the light beam. The first receiving area and the fourth receiving area are located near the guide track on which the prepit is formed, as compared with locations of the second receiving area and the third receiving area. The disk player further includes a first generating device that generates a first difference signal indicating a difference between a first detection signal generated by the light beam that is received in the first receiving area and a third detection signal generated by the light beam that is received in the third receiving area; a second generating device that generates a second difference signal indicating a difference between a second detection signal generated by the light beam that is received in the second receiving area and a fourth detection signal generated by the light beam that is received in the fourth receiving area; and a phase difference detection device that detects a phase difference between the first difference signal and the second difference signal.

In the disk player in accordance with the present invention, when the recording track on the recording disk is irradiated with the light beam, the reflected light beam is received by the light receiving device having four receiving areas. Namely, the reflected light beam is received by the first receiving area, the second receiving area, the third receiving area and the fourth receiving area. Since the locations of the respective four receiving areas are different, the light beam is received in such a way that the light beam is divided into four parts.

When the light beam passes on the prepit, the change in the light beam occurs. This change is received by the respective four receiving areas. Because the locations of the respective receiving areas are different from each other, the timing and the direction of the change of the light beam caused by the prepit is different among the four receiving area.

In response to the reception of the light beam, four detection signals, namely, the first through fourth detection signals are generated. The four detection signals correspond to the four receiving areas, respectively. The change of the light beam caused by the prepit appears as a level change of each detection signal. Because of the difference of the locations of the respective receiving areas, the timing and the direction of the level change is different among the four detection signal.

As to the timing of the level change, the first detection signal and the third detection signal coincide with each other, and the second detection signal and the fourth detection signal coincide with each other. As to the direction of the level change, the first detection signal and the third detection signal are opposite to each other, and the second detection signal and the fourth detection signal are opposite to each other.

In consideration of this, the first difference signal which indicates the difference between the first detection signal and the third detection signal and the second difference signal which indicates the difference between the second detection signal and the fourth detection signal are generated. Thus, the level change caused by the prepit in the first detection signal and the third detection signal more clearly appears in the first difference signal. The level change caused by the prepit in the second detection signal and the fourth detection signal more clearly appears in the second difference signal.

The timing of the level change caused by the prepit is still different between the first difference signal and the second difference signal. This difference appears the phase difference between the first difference signal and the second difference signal. Therefore, in the disk player in accordance with the present invention, the phase difference detection device detects this phase difference.

Based on the detected phase difference, for example, the time difference between the first difference signal and the second difference signal can be compensated for each of individual recording disks. Accordingly, even if the manufacturing conditions of individual recording disks are different, the accurate phase difference can be detected, and, for example, the accuracy of the compensation of the time difference between the first difference signal and the second difference signal can be improved.

In the disk player in accordance with the present invention, a compensating device and a prepit signal generating device may be added. The compensating device is a device for generating a compensation signal by delaying the second difference signal by a delay time determined on the basis of the phase difference. The prepit signal generating device is a device for generating a prepit signal by adding the first difference signal to the compensation signal.

Based on the phase difference detected by the phase difference detection device, the difference in the timings of the level changes caused by the prepit between the first difference signal and the second difference signal is compensated by delaying the second difference signal in such a way that the timings of the level changes in the both signals coincide with each other.

Then, the prepit signal is generated by adding the first difference signal and the delayed second difference signal (i.e., the compensation signal). Because the timings of the level changes caused by the prepit in the first difference signal and the delayed second difference signal coincide with each other, the level change of the first difference signal and the level change of the delayed second difference signal are effectively added. Therefore, the large level change corresponding to the change of the light beam caused by the prepit appears in the prepit signal. Accordingly, even if noise is contained in the prepit signal, it is easy to distinguish the level change corresponding to the change of the light beam caused by the prepit from the noise. Therefore, the accuracy of the prepit detection can be improved.

In the disk player in accordance with the present invention, the compensating device may include: a control voltage setting device that sets a control voltage proportional to the phase difference; and a voltage control delay device that delays the second difference signal by a delay time corresponding to the control voltage. In such a disk player, the phase difference is easily converted into the delay time. Therefore, the accurate prepit detection can be achieved by such a simple construction.

In the disk player in accordance with the present invention, the phase difference detection device may detect the phase difference, while a detection of a recording mark formed on the recording track is not carried out. While the detection of the recording mark is carried out, the reflected light beam is relatively weak, and thus, it is difficult to detect the phase difference. Because of this reason, the phase difference detection is carried out, while the detection of the recording mark is not carried out. Therefore, the performance of the detection of the phase difference can be improved.

In the disk player in accordance with the present invention, the division of the respective four receiving areas in the light receiving surface of the light receiving device may be determined as follows. The back area of the light receiving surface is divided into the first receiving area and the second receiving area by a first division line. The front area of the light receiving surface is divided into the third receiving area and the fourth receiving area by the first division line. The light receiving surface is divided into the back area and the front area by a second division line. The first division line is approximately parallel to the recording track. The second division line is perpendicular to the first division line. The intersection of the first division line and the second division line is located within the light receiving surface.

In the disk player in accordance with the present invention, a delay device that delays a first difference signal may be added. Moreover, DVD-RW (DVD-Rewritable) may be used as the recording disk.

The nature, utility, and further feature of this invention will be more clearly apparent from the following detailed

BRIEF DESCRIPTION OF THE DRAWINGS

FIGS. 4A through 4l are diagrams showing variations of the configuration of the prepit detection circuit;

DETAILED DESCRIPTION OF THE PREFERRED EMBODIMENTS

There will be described below, preferred embodiments of the present invention with reference to the drawings. Here, the following description will refer to a case where the present invention is applied to a disk player which reproduces or records recording information from or onto DVD-RW.

Figure 7:
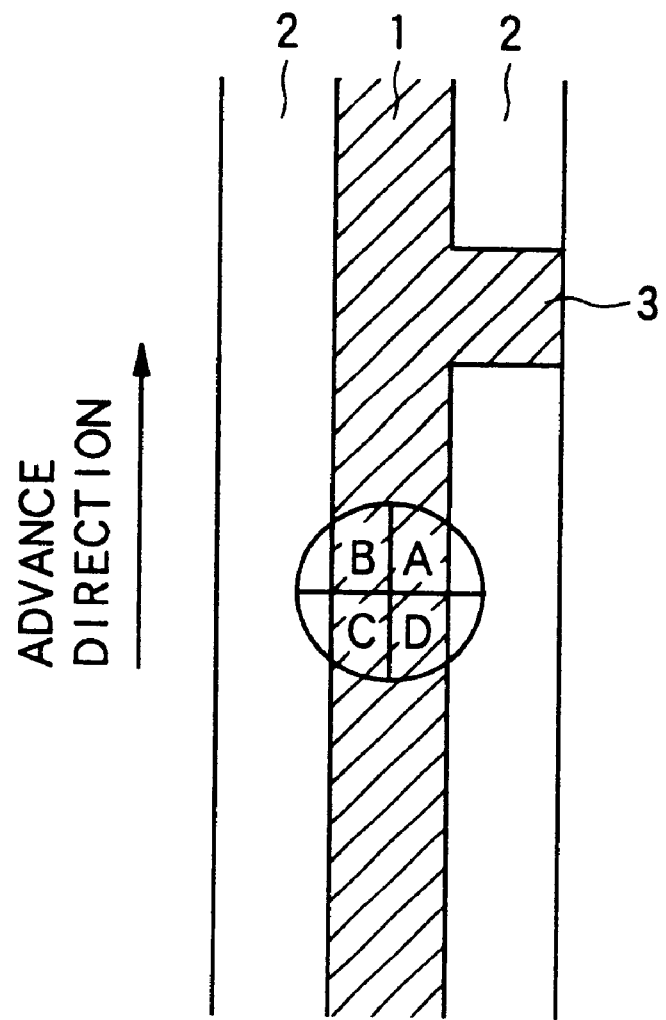
FIG. 7 is a diagram showing a divided form of light receiving elements of a beam spot for a reflected light in a disk type information recording medium.

At first, the description will be given mainly as to a configuration and an operation of a prepit detection circuit of a disk player according to a first embodiment of the present invention with reference to FIGS. 1 and 2. In the disk player according to the first embodiment, a corresponding relationship between a divided form and beam spots of 4-divided light receiving elements used in a pick-up is the same as that of the conventional divided light receiving elements described and shown in FIG. 7.

Figure 1:
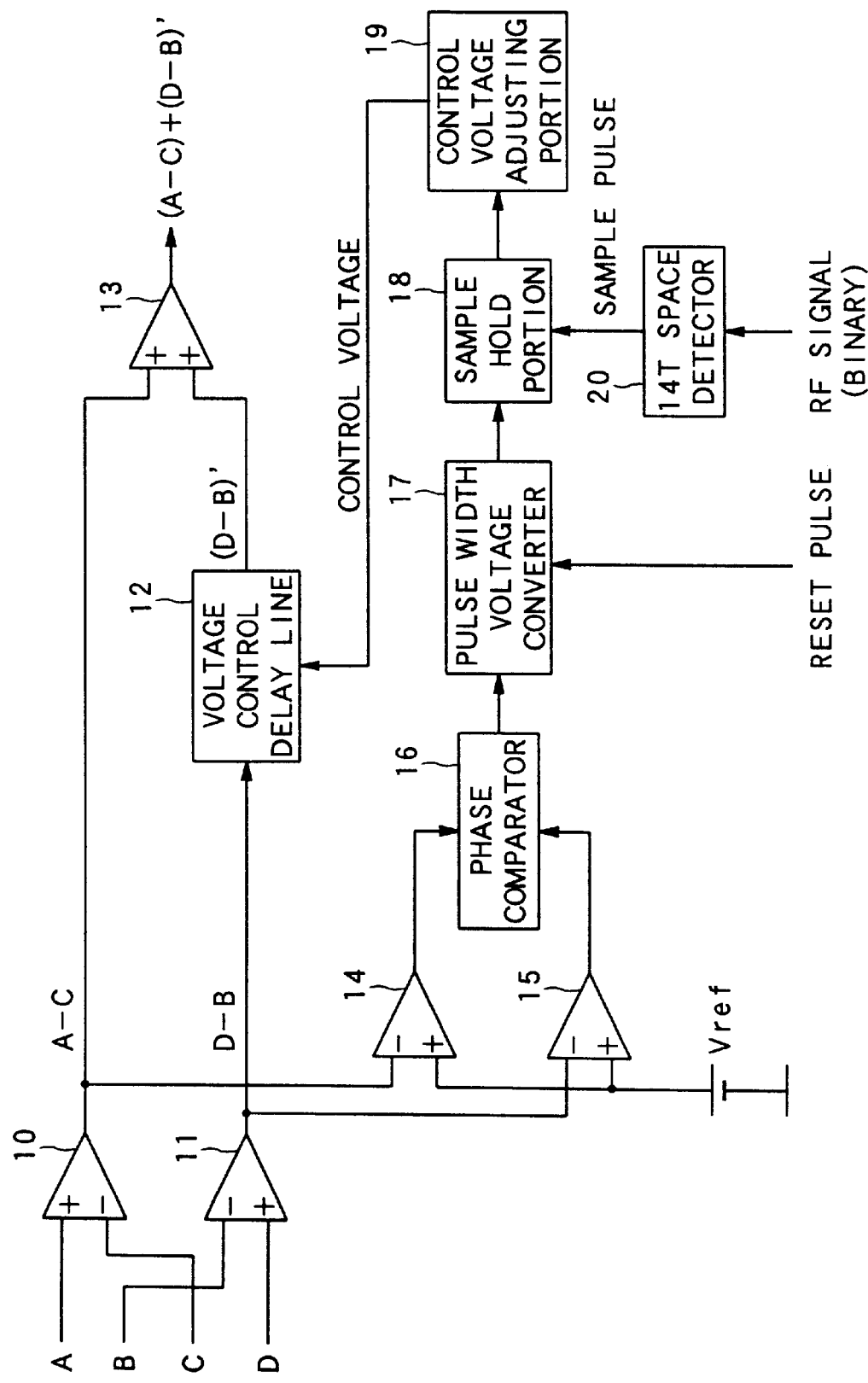
FIG. 1 is a diagram showing a configuration of a prepit detection circuit of a disk player according to a first embodiment.

FIG. 1 is a block diagram mainly showing a configuration of the prepit detection circuit in the disk player according to the first embodiment. As shown in FIG. 1, in the disk player according to the first embodiment, the prepit detection circuit includes subtracters 10 and 11, a voltage control delay line 12, an adder 13, comparators 14 and 15, a phase comparator 16, a pulse width voltage converter 17, a sample-hold portion 18, a control voltage adjusting portion 19 and a 14T space detector 20. In FIG. 1, the 4-divided light receiving elements divide a reflected light of a light beam emitted onto a disk into four areas A, B C and D so as to receive them. Detection signals of the reflected lights are output from the divided areas A through D so as to be input into the prepit detection circuit. Moreover, after RF signals are output from the 4-divided light receiving elements so as to be binarized, the binarized RF signals are input into the prepit detection circuit.

Figure 8:
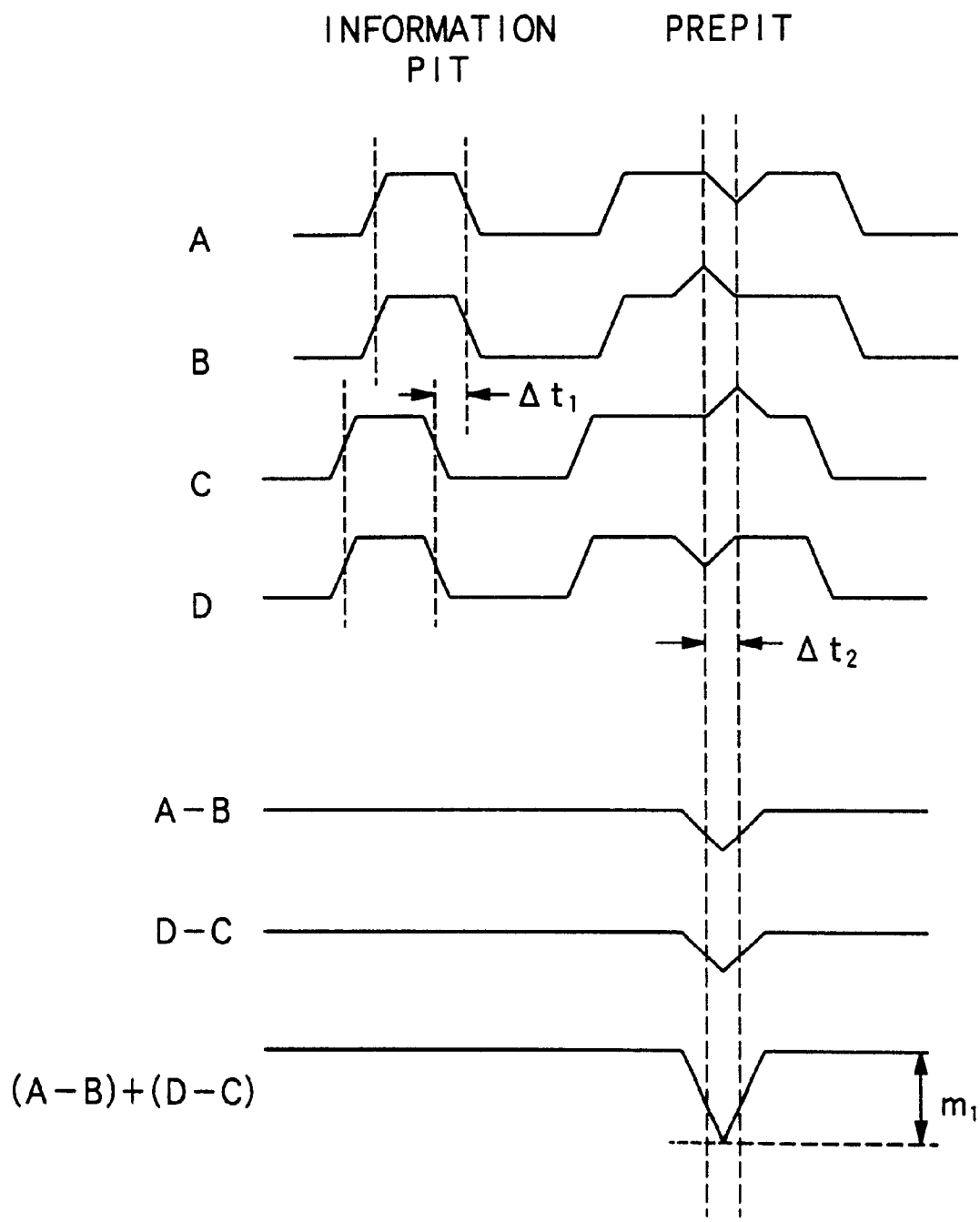
FIG. 8 is a diagram showing waveform patterns when the prepit is detected in a conventional disk player.

There will be described below waveform patterns of respective portions of the prepit detection circuit according to the first embodiment with reference to FIG. 2. FIG. 2 shows waveform patterns when a prepit 3 on a land track 2 is detected on a portion where an information pit of a groove track 1 does not exist. At first, as shown in FIG. 2, when the prepit 3 is started to be detected, signal levels in the areas B and D which change earlier change. Signal levels in the areas A and C which change later delay by delay time $\Delta t$ relative to B and D, and the signal levels change. Since the prepit 3 is an uneven phase pit, the delay time $\Delta t$ is caused by a difference in a diffraction property based on a phase difference between the light beams. Moreover, in FIG. 2, light intensity in the areas A through D changes due to the prepit 3 similarly to the case of FIG. 8.

In the case where the information pit on the groove track 1 is detected, the signal levels in A through D change at the same timing, and directions and amounts of the change in the signal levels are equal to each other. For this reason, the changed portion due to the information pit is canceled when subtractions are made according to A–C and D–B as mentioned later. The signal levels in A through D change due to the information pit at the same timing because in DVD-RW the information pit is not a phase pit and a recording film detects a change in reflectance which varies according to a crystal state or non-crystal state using phase change recording. For this reason, the abovementioned detection delay does not occur.

As shown in FIG. 1 again, the detection signals in the areas A and C are input into the subtracter 10. A difference of the detection signals in A and C is obtained in the subtracter 10 and a differential signal corresponding to A–C is output. As a result, the differential signal A–C changes in a pattern shown in FIG. 2. Namely, a waveform pattern that the signal level is lowered according to the prepit 3 is obtained.

In addition, in FIG. 1, the detection signals in the areas B and D are input into the subtracter 11. A difference of the detection signals in B and D is obtained in the subtracter 11 and a differential signal corresponding to D–B is output. As a result, the differential signal D–B changes in a pattern shown in FIG. 2. Also in this case, a waveform pattern that the signal level is lowered according to the prepit 3 is obtained.

At this time, as for the differential signal A–C and the differential signal D–B, their directions of the change in their signal levels are the same as each other, but a peak of the differential signal A–C is delayed from the differential signal D–B by the delay time $\Delta t$ so as to appear. Therefore, the prepit detection circuit according to the first embodiment corrects the delay in the peaks according to a process mentioned later, so as to suitably cancel the delay time $\Delta t$.

The differential signal D–B output from the subtracter 11 is input into the voltage control delay line 12. In the voltage control delay line 12, the input differential signal D–B is held for delay time which is determined according to a control voltage, and a correction signal (D–B)' which is shifted by the delay time is output. The voltage control delay line 12 is a device for applying a control voltage from the outside and holding a signal by delay time which is substantially proportional to the control voltage so as to output the signal. For example, such a device is on the market in a form of IC. As for the property which is required in the first embodiment, it is enough that assumed delay time $\Delta t$ is within a range that the delay time of the voltage control delay line 12 can be controlled.

There will be described below methods of obtaining a phase difference between the differential signal A–C and the differential signal D–B and generating a control voltage to be applied to the voltage control delay line 12. In FIG. 1, the differential signal A–C output from the subtracter 10 is input into the comparator 14, and the differential signal D–B output from the subtracter 11 is input into the comparator 15. In the comparators 14 and 15, a constant reference voltage Vref is connected with a plus-side input terminal, and the differential signals A–C and D–B are binarized respectively by threshold values corresponding to the reference voltages Vref so as to be output.

Figure 2:
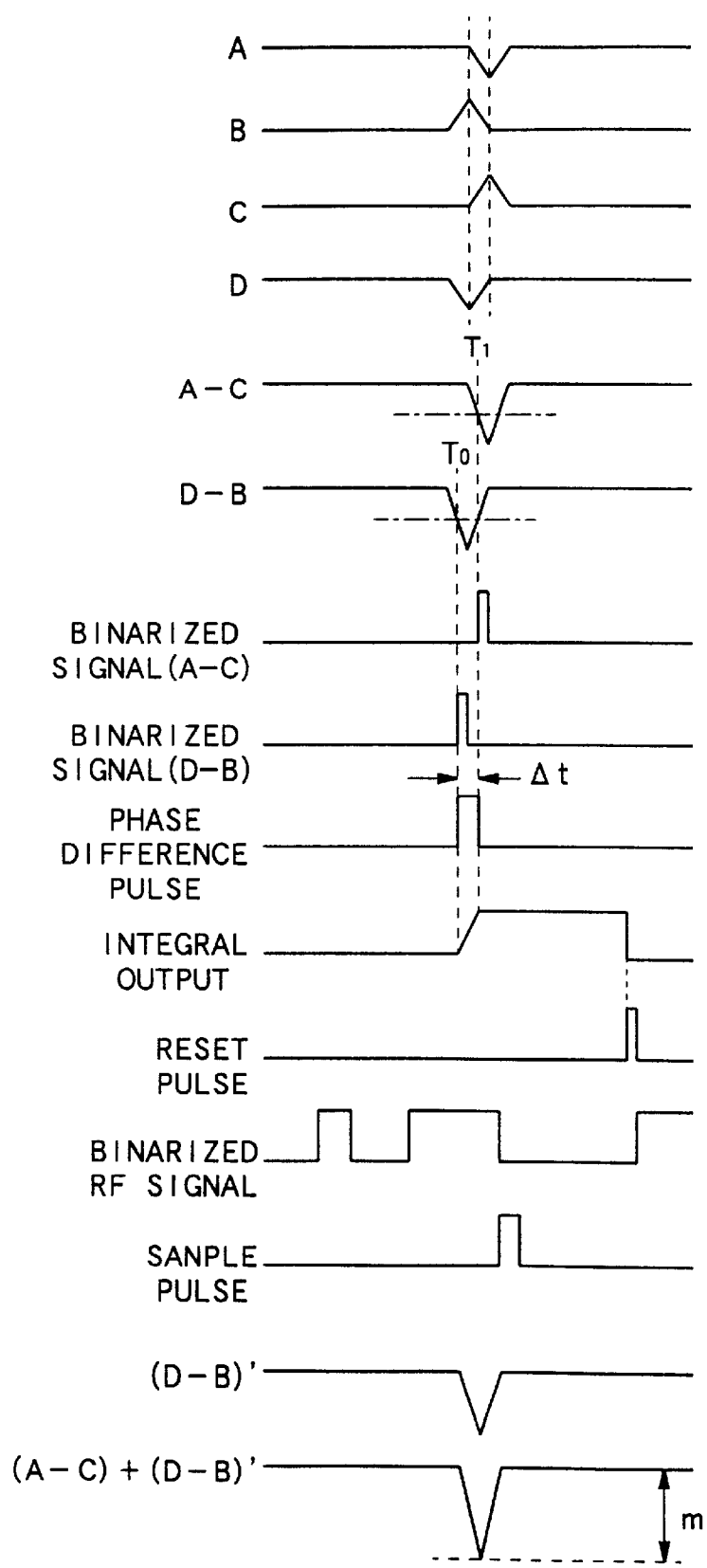
FIG. 2 is a diagram showing waveform patterns of respective portions of the prepit detection circuit of the disk player according to the first embodiment.

Namely, as shown in FIG. 2, since the signal level of the differential signal D–B is high at first, the binarized output is held low, but the signal level is less than the threshold value at timing TO after the prepit 3 is started to be detected. For this reason, the binarized output becomes high. The binarized output of the differential signal A–C changes similarly, but timing T1 that the binarized output becomes high is delayed by the delay time Δt from the timing TO. Only this point is different from that of the differential signal D–B.

The binarized outputs output from the comparators 14 and 15 are input into the phase comparator 16. As shown in FIG. 2, a phase difference pulse, which becomes high from the rising of the binarized output of the differential signal D–B to the rising of the binarized output of the differential signal A–C, is output from the phase comparator 16. Namely, the phase difference pulse shows a waveform pattern having a pulse width of the delay time Δt.

The phase difference pulse output from the phase comparator 16 is input into the pulse width voltage converter 17. In the pulse width voltage converter 17, the phase difference pulse is integrated so that an integral output having a level in proportion to the pulse width is generated. The integral output from the pulse width voltage converter 17 is input into the sample-hold portion 18 so as to be held at a level of an integral output at which a sample pulse, mentioned later, is input.

Figure 3:
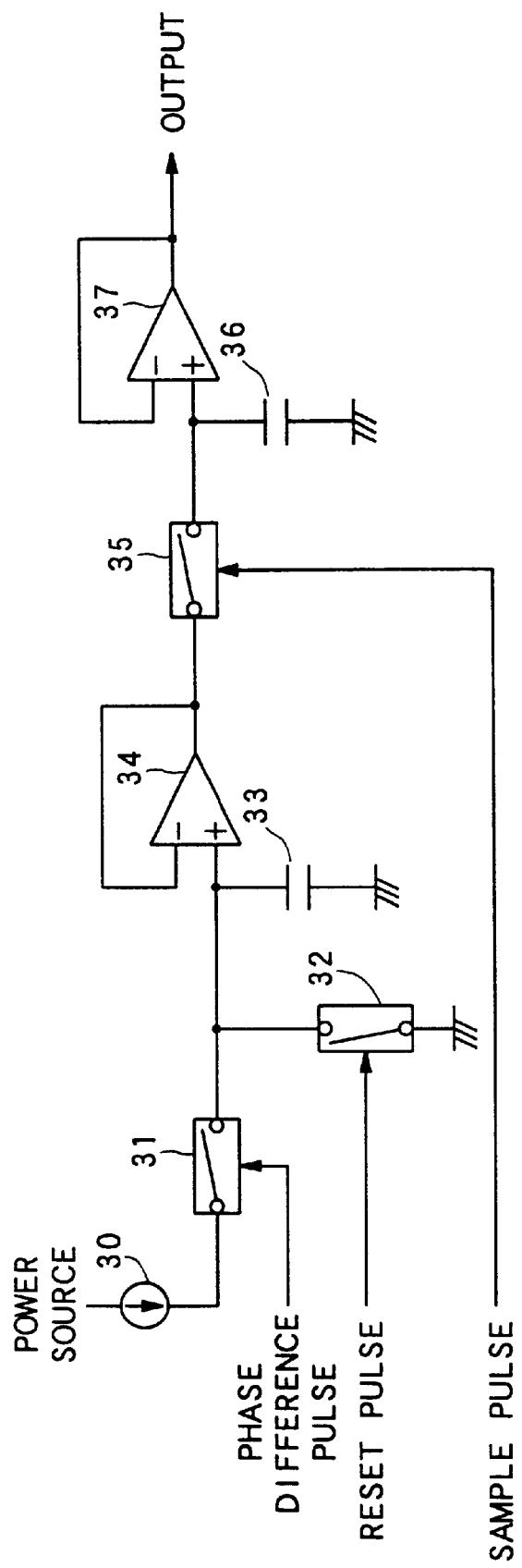
FIG. 3 is a diagram showing a circuit configuration of a pulse width voltage converter and a sample hold portion in the prepit detection circuit.
Figure 4A:
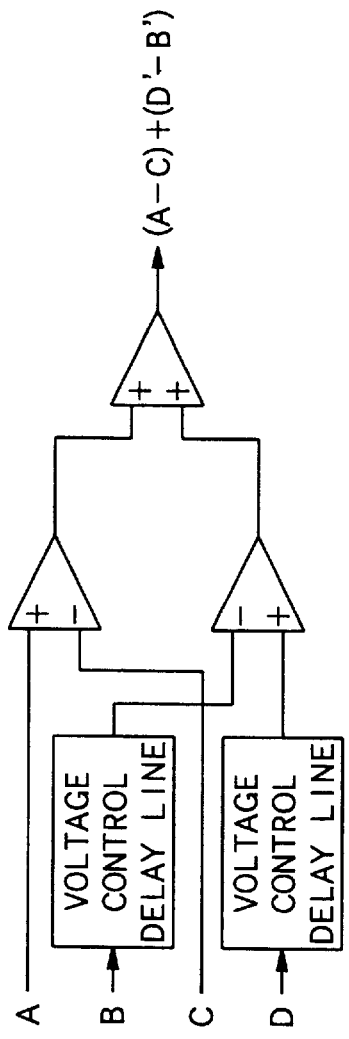
Figure 4B:
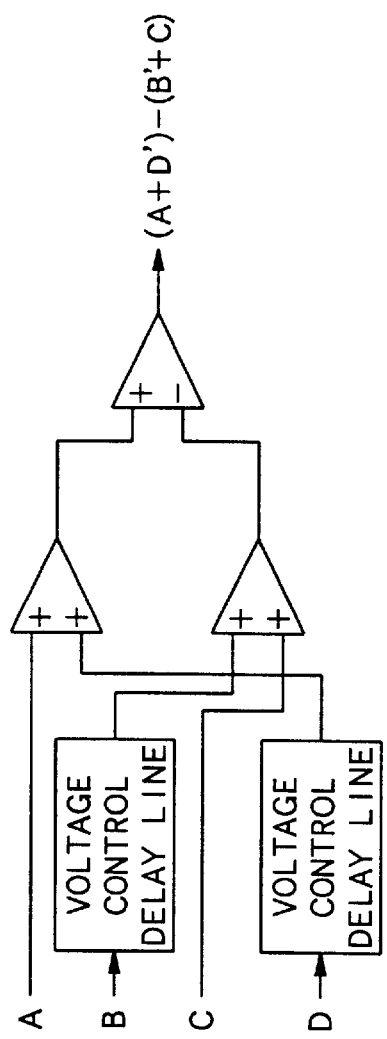
Figure 4C:
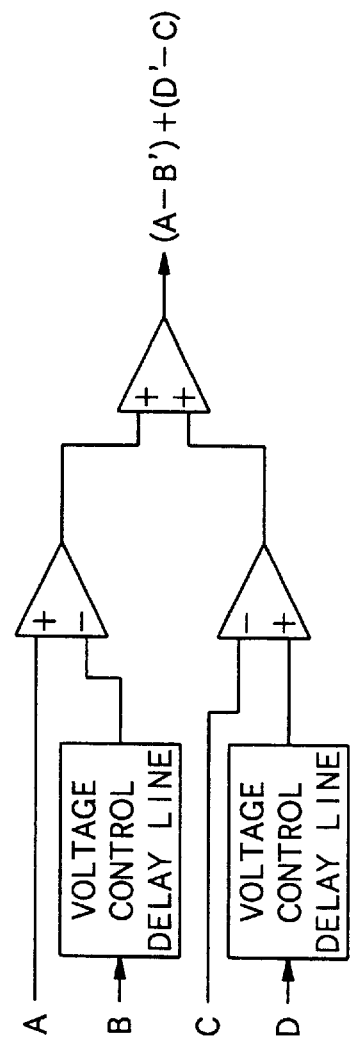
Figure 4D:
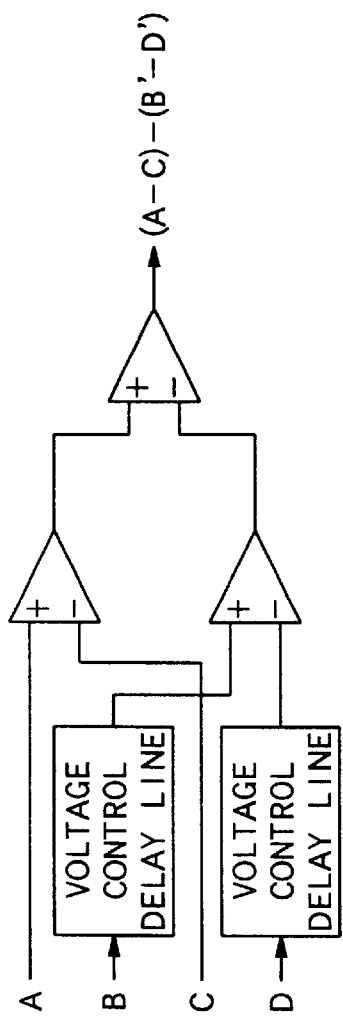
Figure 4E:
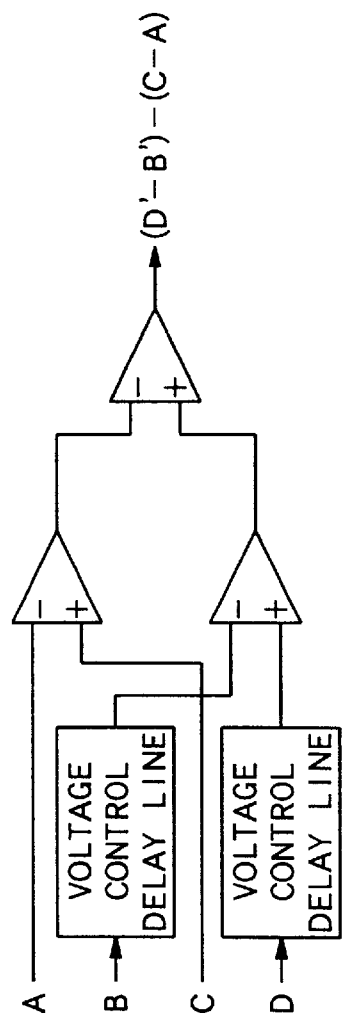
Figure 4F:
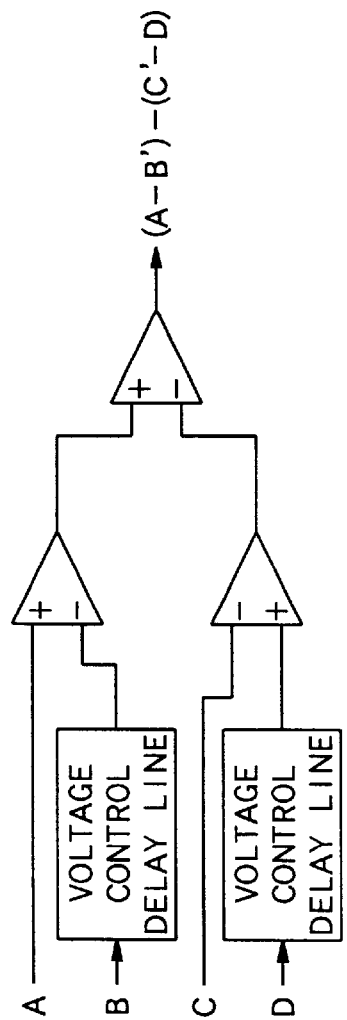
Figure 4G:
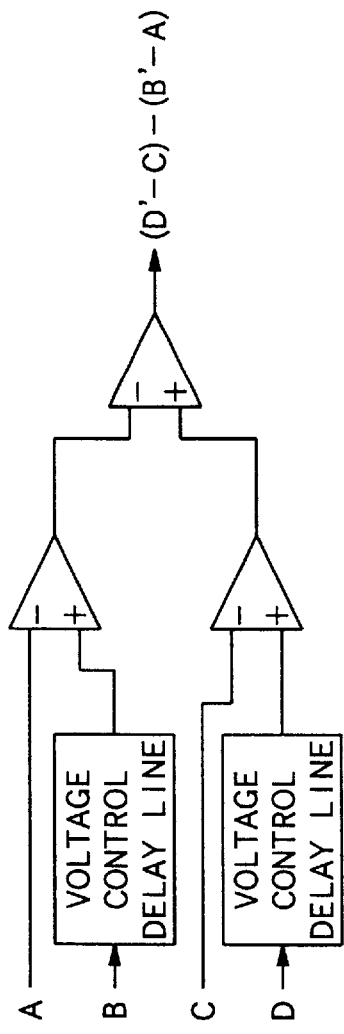
Figure 4H:
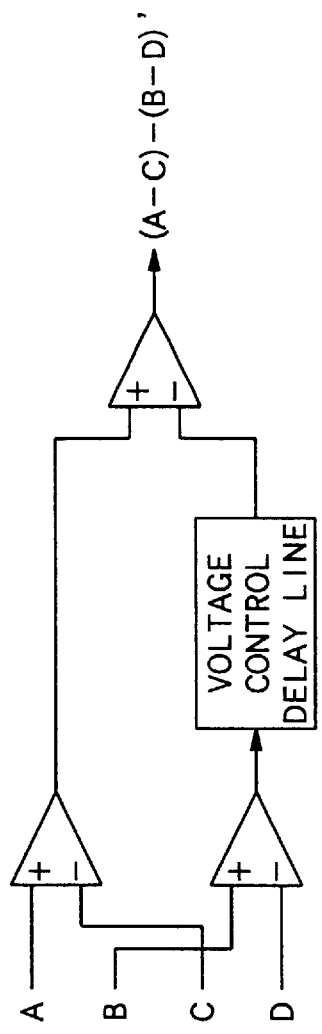
Figure 4I:
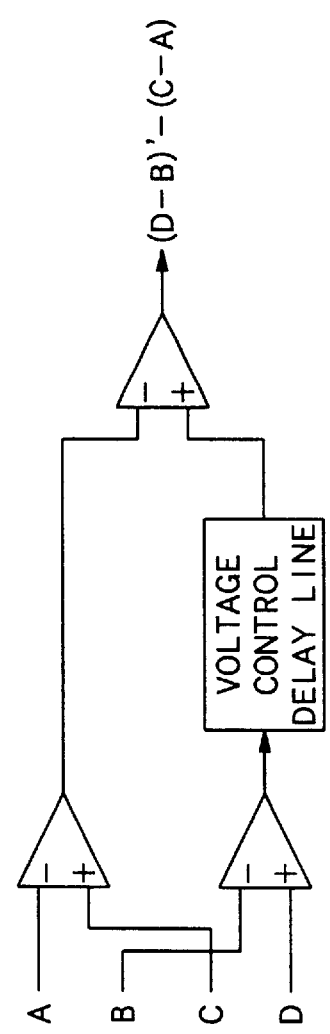

FIG. 3 is a diagram showing a concrete circuit configuration of the pulse width voltage converter 17 and the sample-hold portion 18. As shown in FIG. 3, the whole circuit includes a constant-current source 30, a first switch portion 31, a second switch portion 32, a capacitor 33, an operational amplifier 34, a third switch portion 35, a hold capacitor 36 and an operational amplifier 37.

In the circuit portion corresponding to the pulse width voltage converter 17 in FIG. 3, a charging current is supplied to the capacitor 33 via the first switch portion 31 by the constant-current source 30 whose one terminal is connected with a power source. When the phase difference pulse is high, the first switch portion 31 is turned ON, and a constant current flows from the constant-current source 30 so that the capacitor 33 is charged. As a result, a voltage of a plus-side input terminal of the operational amplifier 34 rises linearly, and voltages of a minus-side input terminal with the same potential and output terminal also rise linearly. According to such an operation of the pulse width voltage converter 17, the waveform of the integral output of the operational amplifier 34 changes as shown in FIG. 2.

When a reset pulse is changed from low into high, the second switch portion 32 is turned ON. One terminal of the second switch portion 32 is connected with the plus-side input terminal of the operational amplifier 34 and the other terminal is connected with a ground. Therefore, when the second switch portion 32 is turned ON, the input and output of the operational amplifier 34 can be lowered to a ground potential. Thus, as shown in FIG. 2, the reset pulse is applied at suitable timing so that the integral output of the pulse width voltage converter 17 is reset. The reset pulse may be output by CPU or the like, or the reset pulse may be generated from a sample pulse output from the 14T space detector 20.

Then, in the circuit portion corresponding to the sample-hold portion 18 in FIG. 3, a charging current is supplied to the hold capacitor 36 via the third switch portion 35 by the integral output from the operational amplifier 34. When the sample pulse is high, the third switch portion 35 is turned ON, and a current flows from the operational amplifier 34 so that the hold capacitor 36 is charged. As a result, the voltages at respective points of the operational amplifier 37 become equal to those of the operational amplifier 34. Thereafter, when the sample pulse becomes low so that the third switch portion 35 is turned OFF, the voltage state of the operational amplifier 37 at that time is held. As a result, a signal, whose level is in proportion to the pulse width of the phase difference pulse, is output from the operational amplifier 37.

As shown in FIG. 1, the above-mentioned sample pulse is generated by the 14T space detector 20. The 14T space detector 20 detects existence of a 14T space in a SYNC pattern of the disk based on the binarized RF signal, and generates a corresponding sample pulse so as to output the generated pulse into the sample-hold portion 18. Namely, as shown in FIG. 2, since a pulse, which becomes high only for constant time width according to the 14T space, can be obtained based on the binarized RF signal, the 14T space can be detected based on the pulse width.

As a result of using the output of the 14T space detector 20 as the sample pulse, the control voltage of the voltage control delay line 12 can be obtained based on the prepit 3 positioned in the 14T space on the disk. Namely, the delay time Δt is set based on the prepit 3 positioned in the 14T space. This is due to the following reasons. Namely, in the position of a recording mark on the disk, a returned light amount is reduced due to the pit corresponding to the recording mark and thus the signal level becomes low on the prepit 3 positioned around the recording mark, and detecting performance is deteriorated. On the contrary, the 14T space has a comparatively long range of unrecorded area, a returned light amount is sufficiently large so that the signal level of the prepit positioned therearound is held high. As a result, the 14T space is advantageous to the detecting performance. For this reason, a phase difference is detected in the position of the 14T space in the above manner so that the process thereafter is executed satisfactorily.

In addition, in DVD-RW, in SYNC pattern, a 14T mark or 14T space is recorded in accordance with a head pit of the prepit 3. Therefore, since the 14T space is superposed on the position of the head pit of the prepit 3 so as to frequently appear on the disk, the delay time Δt of the prepit 3 obtained in the above manner is always updated suitably.

An effect which is similar to the above one can be obtained as long as the phase difference can be comparatively frequently detected in a position other than the 14T space which is not in a range of the recording mark.

Referring back to FIG. 1, an output pulse from the sample-hold portion 18 is input into the control voltage adjusting portion 19. The control voltage adjusting portion 19 amplifies the output pulse from the sample-hold portion 18 by a specified gain and adds a specified DC offset thereto so as to generate a control voltage which is matched with the property of the voltage control delay line 12. The control voltage is applied to the voltage control delay line 12 so that the delay time Δt, which accurately corresponds to the phase difference between two differential signals, is set.

The differential signals D–B input into the voltage control line 12 is held for the delay time Δt set in the above manner so as to be output as a correction signal (D–B)'. Then, the differential signal A–C output from the subtracter 10 and the correction signal (D–B)' output from the voltage control delay line 12 are input into the adder 13. In the adder 13, the differential signal A–C is added to the correction signal (D–B)' so that a prepit detection signal (A–C)+(D–B)' is output.

As shown in FIG. 2, the differential signal A–C and the correction signal (D–B)' show the same change pattern with respect to the prepit 3, and their changes are made at the same timing and their peaks coincide with each other. Therefore, the prepit detection signal (A–C)+(D–B)' output from the adder 10 also changes at the same timing as of the differential signal A–C and the correction signal (D–B)', and its peak appears with a size which is double the size of the differential signal A–C and the correction signal (D–B)'. As a result, the prepit detecting range m is larger than the prepit detecting range ml which is in the conventional case of detecting the prepit shown in FIG. 8.

In the prepit detecting range m, when a threshold is set suitably, the prepit 3 is determined by whether the prepit 3 exceeds the threshold. At this time, in the case where the intensity of the reflected light of the light beam received by the light receiving elements fluctuates due to an influence of a noise or the like, the wider prepit detecting range m is, the more sufficiently a detection margin is secured. For this reason, a fluctuation in the detection signal level does not influence the detection so much. Therefore, in the case where the prepit detection circuit is constituted according to the first embodiment, even when the detection signal, which is the same as that of the conventional prepit detection circuit, is used, the detecting accuracy is high and satisfactory detecting performance can be obtained.

The configuration of the above-mentioned prepit detection circuit is not limited to the configuration shown in FIG. 1, and thus variations according as an order of operations or the like can be applied. FIGS. 4A through 4I show variations which are different from FIG. 1 as the configuration of the prepit detection circuit. In FIGS. 4A through 4I, in order to simplify the configuration, only the adder, subtracter and voltage control delay line are shown.

The order and direction of the adder and subtracter with respect to A through D and inserting position and a number of the voltage control delay lines are changed so that the prepit circuit can be constituted as shown in FIGS. 4A through 4I. In any configuration, the prepit detection signal obtained as the output is equivalent to the prepit detection signal (A–C)+(D–B)' of FIG. 1 with respect to obtaining the large prepit detection range, and the prepit can be detected in the similar manner.

There will be described below a second embodiment of the present invention with reference to FIGS. 5 and 6. In the second embodiment, most parts of the configuration of the prepit detection circuit is similar to the configuration in the first embodiment, but the second embodiment is different from the first embodiment in that the correction signal (D–B)' is used instead of the differential signal D–B so that the delay time Δt is obtained. Here, the relationship between the divided form of the 4-divided light receiving elements to be used in the disk player of the second embodiment and the beam spots is the same as that of the first embodiment.

Figure 5:
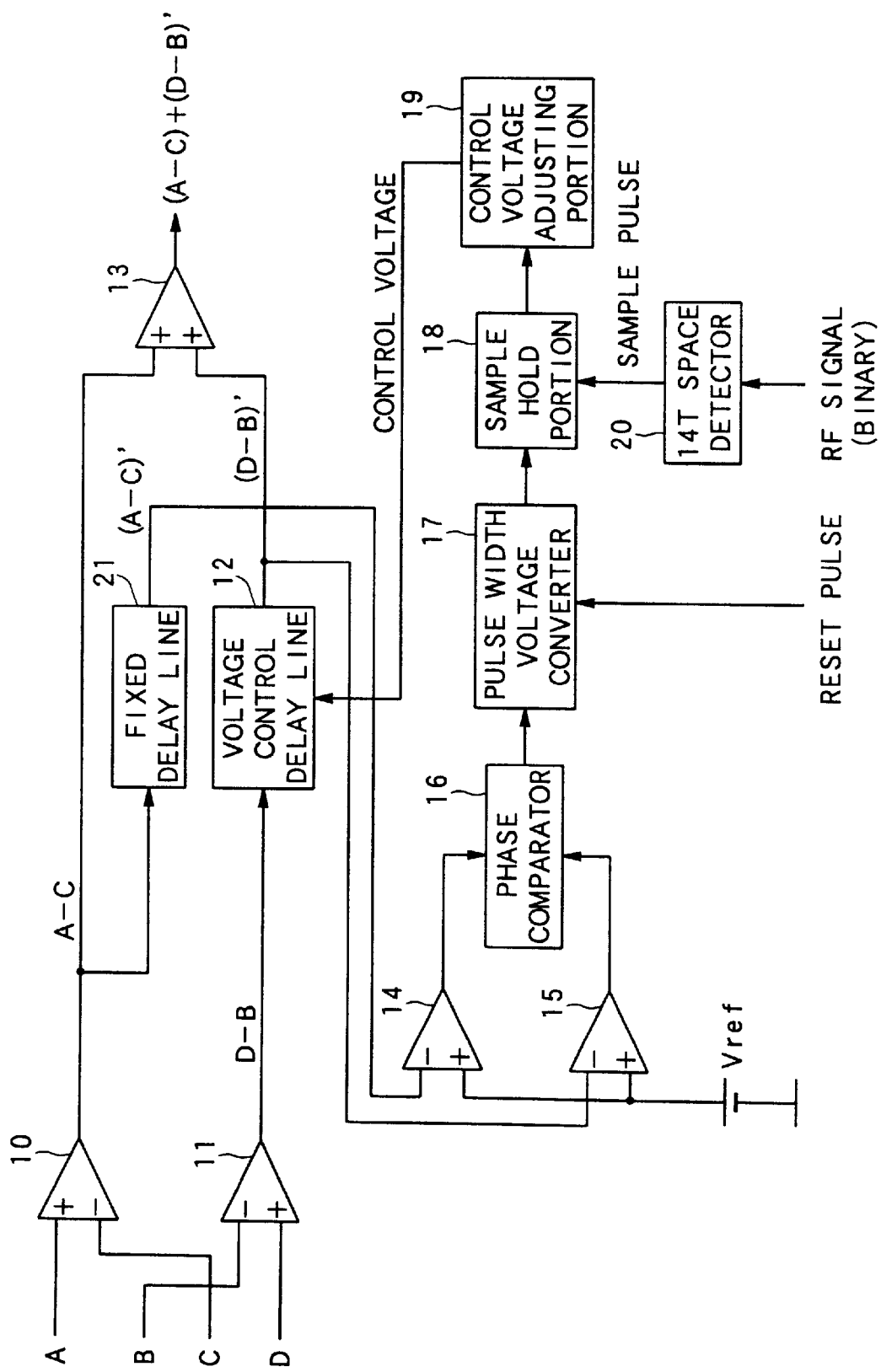
FIG. 5 is a diagram showing a configuration of a prepit detection circuit of a disk player according to a second embodiment.

FIG. 5 is a block diagram corresponding to FIG. 1 showing the prepit detection circuit of the disk player according to the second embodiment. In FIG. 5, the same reference numerals are given to the components same as those in FIG. 1, and the description thereof will be omitted. In FIG. 5, a fixed delay line 21 is additionally provided between the subtracter 10 and the comparator 14, and the output of the subtracter 11 is not connected with the comparator 15. However, the output of the voltage control delay line 12 is connected with the comparator 15.

Figure 6:
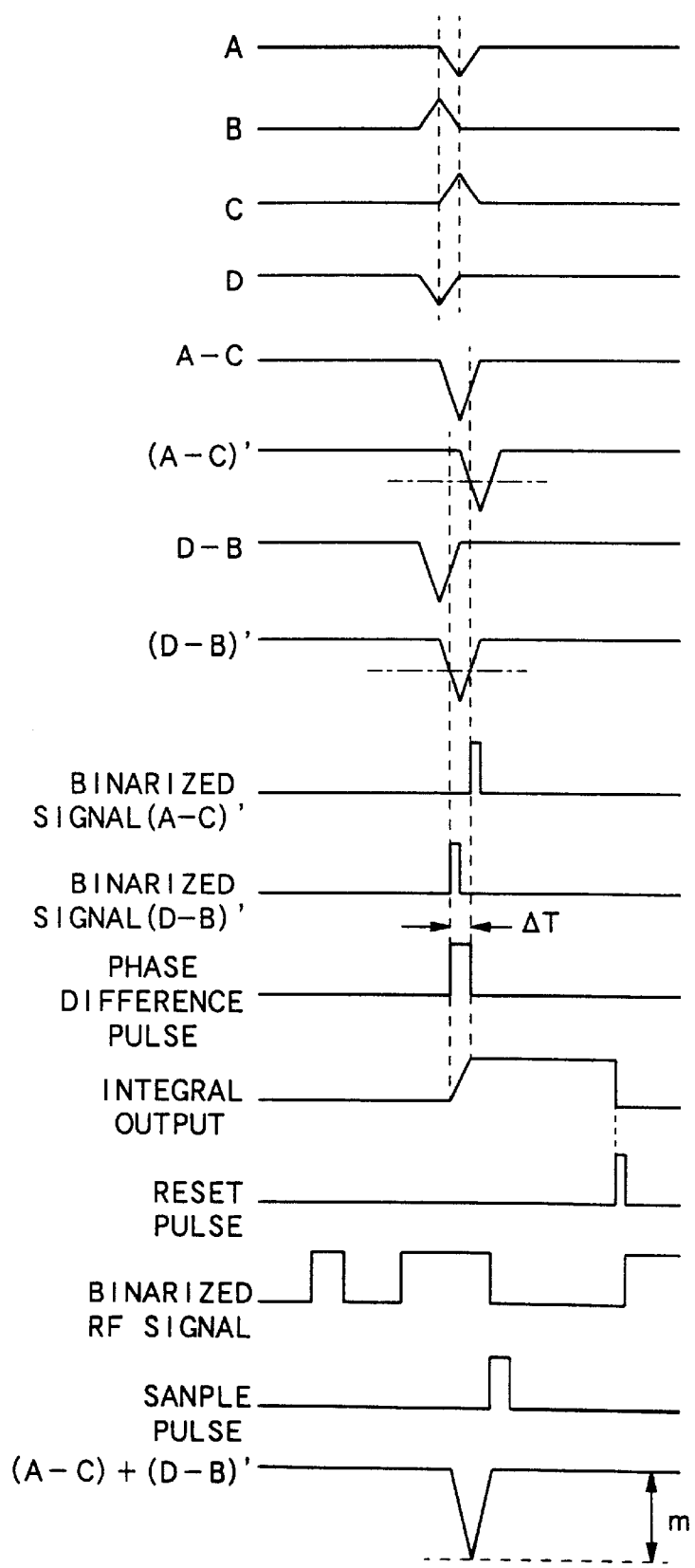
FIG. 6 is a diagram showing waveform patterns of the respective portions of the prepit detection circuit of the disk player according to the second embodiment.

FIG. 6 is a diagram showing waveform patterns of the respective portions of the prepit detection circuit according to the second embodiment. FIG. 6 is similar to FIG. 2 except that a correction signal (A–C)' output from the fixed delay line 21 is added and the timing of the respective signals is slightly different from each other. Therefore, in FIG. 6, the description about the points same as those in FIG. 2 will be omitted.

In FIG. 5, the differential signal A–C output from the subtracter 10 is input into the fixed delay line 21. The fixed delay line 21 holds the differential signal A–C for delay time ΔT as a specified fixed value so as to output a delayed correction signal (A–C)'. The fixed delay line 21 cannot change delay time unlike the aforementioned voltage control delay line 12, and thus the preset delay time ΔT is used fixedly.

The correction signal (A–C)' output from the fixed delay line 21 is input into the comparator 14. Meanwhile, the correction signal (D–B)' output from the voltage control delay line 12 is input into the comparator 15. Therefore, as shown in FIG. 6, the correction signal (A–C)' and the correction signal (D–B)' are binarized so as to be output respectively from the comparators 14 and 15.

As shown in FIG. 6, a phase difference pulse output from the phase comparator 16 becomes high from the rising of the binarized output of the correction signal (D–B)' to the rising of the binarized output of the correction signal (A–C)'. Here, if the correction in the voltage control delay line 12 is made suitably, a pulse width of the phase difference pulse substantially coincides with the delay time ΔT of the fixed delay line 21.

Here, when the fixed delay line 21 is not provided, the phase of the differential signal (A–C) coincides with the phase of the correction signal (D–B)', and thus a relationship between the phases is not fixed so that a suitable phase difference pulse cannot be obtained. For this reason, in the second embodiment, the fixed delay line 21 is provided in order to give a fixed bias to the phase relationship.

After the phase difference pulse is output from the phase comparator 16, the pulse width voltage converter 17, the sample-hold portion 18, the control voltage adjusting portion 19 and the 14T space detector 20 execute the process in the similar manner to that in the first embodiment so that a control voltage for the voltage control delay line 12 is generated. In the adder 13, the differential signal A–C and the correction signal (D–B)' are added to each other so that the prepit detection signal (A–C)+(D–B)' is output.

In the second embodiment, since the phase difference pulse is obtained after being delayed by the delay time Δt, the detection in the phase difference is fed back. Therefore, although responsibility which is equal to that of the first embodiment cannot be obtained, even in the case where a shift of the phase difference pulse occurs due to an influence of noise or the like, the shift is corrected automatically. As a result, the prepit can be detected without being influenced by an external noise.

As described above, in the disk player of the respective embodiments, the phase difference, which is caused by the shift in the prepit detection timing in the respective divided areas of the light receiving elements, is detected, and delay time is obtained based on the phase difference so that the prepit detection signal is obtained. As a result, the prepit detecting range m is obtained for the prepit 3 formed as a phase pit so that a large detection margin is secured. Therefore, possibility of misdetection of the prepit 3, which is caused by a fluctuation of the detection signal due to a nose or the like, is reduced. Moreover, in the case where the phase difference fluctuates according to cutting conditions of the prepit 3, the accurate phase difference is always detected so that the prepit can be detected with high accuracy.

The aforementioned embodiments described the case where the present invention is applied to DVD-RW on which recording information can be recorded repeatedly, but besides this case, the present invention can be applied to a disk type information recording medium where an information pit is recorded by a change in reflectance and the prepit 3 is formed as a phase pit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. Hei 11-13127 filed on Jan. 21, 1999 including the specification, claims, drawings and summary is incorporated herein by reference in its entirety.

What is claimed is:

1. A disk player for recording or reproducing recording information to a recording disk by emitting a light beam onto a recording disk, the recording disk having a recording track for recording the recording information, a guide track for guiding the light beam to the recording track, and a prepit which is pre-formed on the recording track and which serves as a control information for controlling a recording operation or a reproduction operation of the disk player, the disk player comprising:

a light receiving device that receives the light beam reflected by the recording disk and that has a light receiving surface in which a first receiving area, a second receiving area, a third receiving area and a fourth receiving area are formed, the first receiving area and the second receiving area being located in the back area of the light receiving surface with respect to an advance direction of the relative movement of the light beam with respect to the recording track, the third receiving area and the fourth receiving area being located in a front area of the light receiving surface with respect to the advanced direction of the movement of the light beam, the first receiving area and the fourth receiving area being located near the guide track on which the prepit is formed, as compared with locations of the second receiving area and the third receiving area;

a first generating device that generates a first difference signal indicating a difference between a first detection signal generated by a light beam that is received in the first receiving area and a third detection signal generated by a light beam that is received in the third receiving area;

a second generating device that generates a second difference signal indicating a difference between a second detection signal generated by the light beam that is received in the second receiving area and a fourth detection signal generated by the light beam that is received in the fourth receiving area; and a control signal generating device that generates a control signal based on a phase difference between the first difference signal and the second difference signal at a space portion of a binarized RF signal.

2. The disk player according to claim 1 further comprising:

a compensating device that generates a compensation signal by delaying the second difference signal by a delay time determined on the basis of the control signal; and a prepit signal generating device that generates a prepit signal by adding the first difference signal to the compensation signal.

3. The disk player according to claim 2, wherein the compensating device delays the second difference signal such that a peak position of the second difference signal coincides with a peak position of the first difference signal.

4. The disk player according to claim 1, wherein the compensating device comprises:

a voltage control delay device that delays the second difference signal by a delay time corresponding to the control signal.

5. The disk player according to claim 1, wherein the back area of the light receiving surface is divided into the first receiving area and the second receiving area by a first division line, the front area of the light receiving surface is divided into the third receiving area and the fourth receiving area by the first division line, the light receiving surface is divided into the back area and the front area by a second division line, the first division line is approximately parallel to the recording track, the second division line is perpendicular to the first division line, and an intersection of the first division line and the second division line is located within the light receiving surface.

6. The disk player according to claim 1, wherein the recording disk is a DVD-RW (DVD-Rewritable).

7. The disk player according to claim 1, wherein the control signal generating device comprises:

a phase comparator that detects a phase difference between the first difference signal and the second difference signal;

a pulse width voltage converter that outputs an integral output having a level in proportion to the phase difference;

a sample-hold portion that holds a level of the integral output at a sample pulse; and a space detector that detects the existence of the space portion to generate the sample pulse.

8. The disk player according to claim 7, wherein the space detector detects a 14T space in a SYNC pattern of the recording disk based on the binarized RF signal.

9. A disk player for recording or reproducing recording information to a recording disk by emitting a light beam onto the recording disk, the recording disk having a recording track for recording the recording information, a guide track for guiding the light beam to the recording track, and a prepit which is pre-formed on the guiding track and which serves as control information for controlling a recording operation or a reproduction operation of a disk player, the disk player comprising:

a light receiving device that receives the light beam reflected by the recording disk and that has a light receiving surface in which a first receiving area, a second receiving area, a third receiving area and a fourth receiving area are formed, the first receiving area and the second receiving area being located in a back area of the light receiving surface with respect to an advance direction of the relative movement of the light beam with respect to the recording track, the third receiving area and the fourth receiving area being located in a front area of the light receiving surface with respect to the advanced direction of the movement of the light beam, the first receiving area and the fourth receiving area being located near the guide track on which the prepit is formed, as compared with locations of the second receiving area and the third receiving area;

a first generating device that generates a first difference signal indicating a difference between a first detection signal generated by the light beam that is received in the first receiving area and a third detection signal generated by the light beam that is received in the third receiving area;

a second generating device that generates a second difference signal indicating a difference between a second detection signal generated by the light beam that is received in the second receiving area and a fourth detection signal generated by the light beam that is received in the fourth receiving area;

a first compensating device that generates a first compensation signal by delaying the first difference signal;

a second compensating device that generates a second compensation signal by delaying the second difference signal; and a control signal generating device that generates a control signal based on a phase difference between the first compensation signal and the second compensation signal at a space portion of a binarized RF signal.

10. The disk player according to claim 9, wherein the second compensating device generates the second compensation signal by delaying the second difference signal by a delay time determined on the basis of the control signal; and wherein the disk player further comprises a prepit signal generating device that generates a prepit signal by adding the first compensation signal to the second compensation signal.

11. The disk player according to claim 10, wherein the second compensating device delays the second difference signal such that a peak position of the second compensation signal coincides with a peak position of the first compensation signal.

12. The disk player according to claim 9, wherein the second compensating device comprises:

a voltage control delay device that delays the second difference signal by a delay time corresponding to the control signal.

13. The disk player according to claim 9, wherein the back area of the light receiving device is divided into the first receiving area and the second receiving area by a first division line, the front area of the light receiving surface is divided into the third receiving area and the fourth receiving area by the first division line, the light receiving surface is divided into the back area and the front area by a second division line, the first division line is approximately parallel to the recording track, the second division line is perpendicular to the first division line, and an intersection of the first division line and the second division line is located within the light receiving surface.

14. The disk player according to claim 9, wherein the recording disk is a DVD-RW (DVD-Rewritable).

15. The disk player according to claim 9, wherein the control signal generating device comprises:

a phase comparator that detects a phase difference between the first compensation signal and the second compensation signal;

a pulse width voltage converter that outputs an integral output having a level in proportion to the phase difference;

a sample-hold portion that hold a level of the integral output at a sample pulse; and a space detector that detects existence of the space portion to generate the sample pulse.

16. The disk player according to claim 15, wherein the space detector detects a 14T space in a SYNC pattern of the recording disk based on the binarized RF signal.

* * * * *

UNITED STATES PATENT AND TRADEMARK OFFICE
CERTIFICATE OF CORRECTION

PATENT NO. : 6,456,574 B1 Page 1 of 1
DATED : September 24, 2002
INVENTOR(S) : Masahiro Kato It is certified that error appears in the above-identified patent and that said Letters Patent is hereby corrected as shown below:

Column 11,
Line 38, please change "recording track" to -- guiding track --

Signed and Sealed this

Eighth Day of April, 2003

JAMES E. ROGAN
*Director of the United States Patent and Trademark Office*